(No Model.)
J. ANDERSON, Jr.
HARROW.
No. 263,089. Patented Aug. 22, 1882.
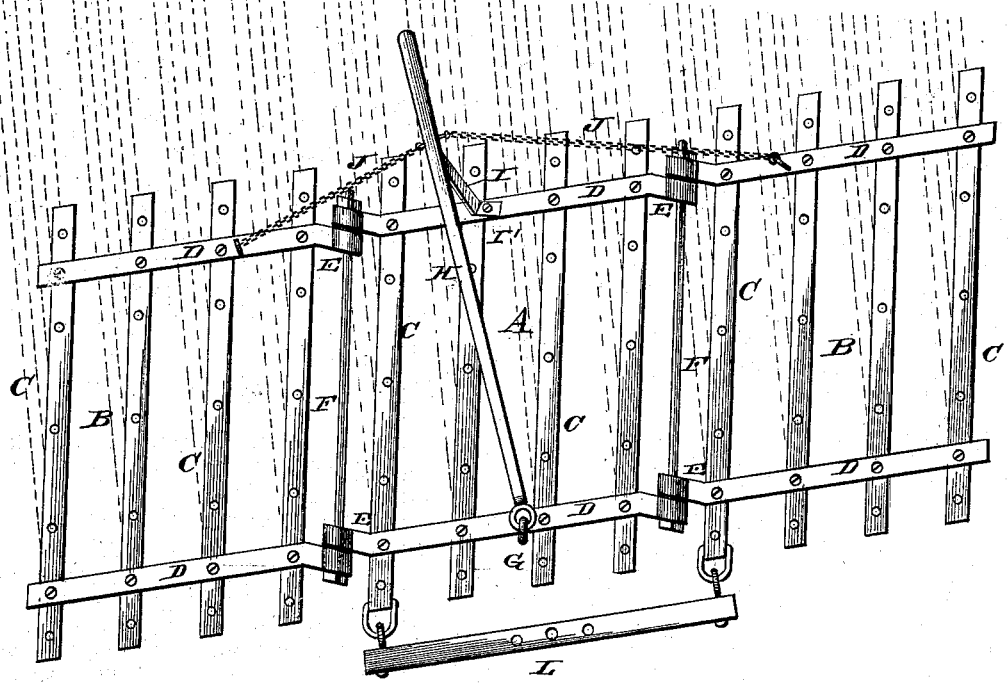
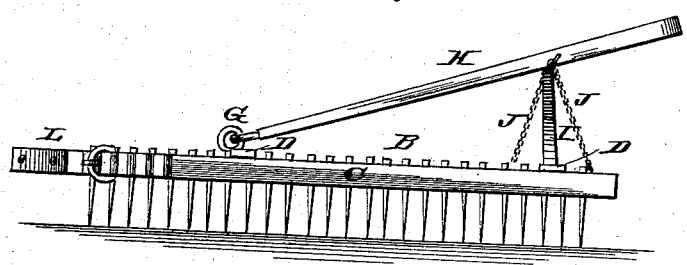
WITNESSES:
INVENTOR.
ATTORNEYS.

United States Patent Office.

JAMES ANDERSON, JR., OF ANDERSON, OHIO.

HARROW.

SPECIFICATION forming part of Letters Patent No. 263,089, dated August 22, 1882.

Application filed May 6, 1882. (No model.)

*To all whom it may concern:*

Be it known that I, JAMES ANDERSON, Jr., of Anderson, in the county of Ross and State of Ohio, have invented certain new and useful Improvements in Harrows; and I do hereby declare that the following is a full, clear, and exact description of the invention, which will enable others skilled in the art to which it appertains to make and use the same, reference being had to the accompanying drawings, which form a part of this specification.

Figure 1 is a top plan view of my improved harrow, and Fig. 2 is a front view of the same.

Similar letters of reference indicate corresponding parts in both figures.

This invention relates to harrows; and it consists in certain improvements in the construction of the same, which will be hereinafter fully described, and particularly pointed out in the claim.

My improved harrow consists of three sections—viz., the central or main section, A, and two side sections or wings, B B, which are hinged to the main section. Each section consists of a suitable number of beams or bars, C, (three, four, or five being the usual number,) bolted to iron straps D, which form the hinge-straps. The bars C are placed parallel to each other and diagonally in relation to the hinge-straps, which in turn are placed parallel to each other. The bars C are all made of equal length and made to project evenly in front and rear of the hinge-straps. Being thus arranged, all are necessarily constructed alike and bored alike for the reception of the bolts and the harrow-teeth. This lessens the cost of construction and enables the harrow to be easily and quickly put together. The hinge ends of the straps D are turned diagonally to the bodies of said straps, as at E, to enable the wings to be connected to the main section by the hinge-rods F, as shown.

The front hinge-strap of the main section A has an eye or bearing, G, for a lever, H, provided with a spring-brace, I, extending downwardly and bolted securely, as shown at I', to the rear hinge-strap of the main section. The lever H is connected by ropes or chains J with the side wings, B, of the harrow. It will be seen that by bearing down upon the lever the opposite wing of the harrow may be raised, and thus cleared of weeds and other obstructions. The central or main section may also be so manipulated by the lever H as to clear it of weeds, roots, and similar obstructions, and the spring-brace I serves to return the lever H to its original position when released from the hand of the operator, thereby making said lever easily and conveniently manipulated.

The whiffletree L is connected to the central and to one of the end sections or wings of the harrow by links or in any suitable manner. It will thus be seen that the draft is straight or direct, and not, as is usual with this class of harrows, diagonal, thus giving the operator perfect control and ease in clearing or passing obstructions. Owing to the arrangement herein described of the beams, the teeth are, as shown in Fig. 1, perfectly scattered, so as to rake and work the soil thoroughly without the diagonal draft usually resorted to in order to attain this result.

Having thus described my invention, I claim and desire to secure by Letters Patent of the United States—

The combination of the harrow-sections A B B, having hinge-straps D, with projecting ends E, the hinge-rods F, the lever H, pivoted to the front hinge-strap of the central section and having a downwardly-extending spring-brace, I, bolted securely to the rear hinge-strap of said central section, and the chains K, as and for the purpose set forth.

In testimony that I claim the foregoing as my own I have hereto affixed my signature in presence of two witnesses.

JAMES ANDERSON, JR.

Witnesses:
ALBERT DOUGLAS, Jr.,
E. B. DOLOHAN.